Patented Aug. 8, 1944

2,355,314

UNITED STATES PATENT OFFICE 2,355,314

PREPARATION OF UNSATURATED HYDROCARBONS FROM PRIMARY ALIPHATIC AMINES

Miles R. McCorkle, Chicago, Ill., assignor to Armour and Company, Chicago, Ill., a corporation of Illinois No Drawing. Application July 24, 1942,
Serial No. 452,192

5 Claims. (Cl. 260—677)

This invention relates to processes of preparing straight chain unsaturated aliphatic hydrocarbons and it comprises processes wherein straight chain primary aliphatic amine salts are heated to decompose the same and the resulting unsaturated hydrocarbon recovered.

Unsaturated aliphatic hydrocarbons are valuable chemical intermediates for the preparation of many different chemical compounds. Such hydrocarbons can be sulfonated to yield detergents, converted to higher alcohols, halogen compounds, etc.

Hitherto no satisfactory method for the preparation of olefins having eight or more carbon atoms in the chain has been available. Most of these higher olefins have been made experimentally by complicated synthetic procedures of no value commercially.

I have now discovered that salts of primary aliphatic amines having eight or more carbon atoms can be broken down by heat to yield unsaturated hydrocarbons whose chain length corresponds with that of the alkyl group of the amine. Salts of unsaturated primary amines can be made to yield the corresponding diolefin. Thus, dodecylamine hydrochloride, when heated to decompose the same, will yield dodecene which can be readily collected. Octadecenylamine phosphate will yield octadecadiene, this being an example of the formation of dienes from unsaturated primary aliphatic amine salts.

The salts of all primary aliphatic amines with non-oxidizing, inorganic acids have, as I have discovered, the property of breaking down into an unsaturated hydrocarbon whose chain length is that of the alkyl group of the amine. Such amine salts are salts of octylamine, decylamine, dodecylamine, tetradecylamine, dexadecylamine, octadecylamine, and the corresponding unsaturated analogues such as dodecenylamine, octadecenylamine, etc. The above list is representative of those primary amines having at least eight carbon atoms.

Amine phosphates and amine hydrochlorides are advantageous salt forms of the amine used. The phosphate salts are especially suitable since ammonium metaphosphate, formed as a by-product, decomposes during the reaction to liberate ammonia and metaphosphoric acid. This property enables me to utilize the principles of this invention in such fashion that the process can be made continuous. For example, heated phosphoric acid is maintained in a reaction vessel and a primary aliphatic amine, such as octyl amine, added slowly thereto. With the reaction temperature at that at which octyl amine phosphate decomposes octylene is continuously liberated and can be readily condensed. The course of the reaction is probably as follows. The octylamine reacts momentarily with the metaphosphoric acid to form an amine phosphate. This then breaks down to form octylene and ammonium metaphosphate. The octylene escapes from the reaction vessel as the ammonium metaphosphate decomposes to form ammonia and metaphosphoric acid. The ammonia is driven out of the reaction vessel. Further added octylamine reacts with the re-formed metaphosphoric acid and so the reaction proceeds continuously. Thus, through the intermediary of metaphosphoric acid I am decomposing octylamine to form ammonia and octylene.

The reaction temperatures used are about 300° C. to 400° C. and advantageously the pressure is somewhat reduced as will be indicated in the examples. This temperature is obviously correlated with the amine salt and the pressures used. What is required is a temperature such that it is high enough to decompose the amine salt. This temperature will obviously vary depending on the amine salt used, but is not critical. Higher temperatures are not objectionable because the decomposition products are at once driven out of the reaction vessel and hence are not influenced by high temperatures. Therefore the only critical temperature factor is the lowermost temperature and that is obviously subject to variation. Those skilled in the art will clearly appreciate this.

I shall now give specific examples of how my invention can be practised.

Forty-five parts by weight of dedecylamine hylrochloride are heated in a still for two hours at a temperature of 350° C. During the heating dodecene distills over and is condensed. The distillate may be contaminated with a minor amount of dodecylamine which can be readily removed in ways already known. The dodecene amounts to 73 percent of the starting material and thus the yield of olefin is high.

Octadecylamine phosphate is heated for three hours at 325° C. under an absolute pressure of 100 mm. Octadecene distills out of the reaction vessel and is condensed. Similar reaction occurs when dodecylamine phosphate is heated to distill the dodecene therefrom.

The continuous process referred to above is advantageously carried out in the following manner. A reaction vessel is charged with phosphoric acid and heated to about 400° C. Dodecylamine is then added dropwise over a period of seven hours. The dodecene formed distills out as the amine is added and the inflow of amine is made to balance the rate at which the dodecene leaves the reaction zone. In this example 20 parts by weight of phosphoric acid were used at the start and 160 parts by weight of amine were added. The metaphosphoric acid is of course recovered in the reaction vessel at the end of the process.

Octylamine, added to heated metaphosphoric acid as described above, readily yields octylene at 400° C.

In each of the above examples some improvement in yield is noticed when activated carbon or other contact material is added to the reaction mixture.

Reduced pressures are advantageous in that they facilitate rapid removal of the formed hydrocarbon. However, reduced pressures are not necessary to the successful performance of the process.

In the foregoing examples reference has been made to the decomposition of saturated primary aliphatic amine salts to yield olefins. Unsaturated amine salts similarly yield dienes as pointed out above. Thus primary octadecenylamine phosphate heated at 350° C. to 370° C. yields octadecediene. Yields thereof are 86 percent of theoretical.

Having thus described my invention what I claim is:

1. The process which comprises heating salt of a primary aliphatic amine having at least eight carbon atoms and a non-oxidizing inorganic acid to decompose the same, and recovering the unsaturated hydrocarbon thus formed.

2. The process which comprises heating a primary aliphatic amine phosphate having at least eight carbon atoms to decompose the same and recovering the unsaturated hydrocarbon thus formed.

3. The process which comprises maintaining a body of phosphoric acid heated to a temperature high enough to decompose primary aliphatic amine phosphates having at least eight carbon atoms, and adding a primary aliphatic amine having at least eight carbon atoms thereto to decompose the amine and liberate an unsaturated hydrocarbon, and recovering the unsaturated hydrocarbon.

4. The process as in claim 1 wherein the amine salt is a dodecylamine salt.

5. The process as in claim 3 wherein the amine is added to the phosphoric acid continuously as the unsaturated hydrocarbon is formed.

MILES R. McCORKLE.